United States Patent [19]

Sekiguchi et al.

[11] 4,314,109

[45] Feb. 2, 1982

[54] SYNCHRONIZATION SYSTEM FOR KEY TELEPHONE SYSTEM

[75] Inventors: Koichi Sekiguchi, Asaka; Kazuyuki Yamamoto, Yokohama, both of Japan

[73] Assignees: Iwasaki Tsushinki Kabushiki Kaisha; Nippon Telegraph & Telephone Public Corporation, both of Japan

[21] Appl. No.: 151,733

[22] Filed: May 20, 1980

[30] Foreign Application Priority Data

Jun. 5, 1979 [JP] Japan .................. 54-70375

[51] Int. Cl.³ .................. H04J 3/06; H04J 3/12; H04M 1/72
[52] U.S. Cl. .................. 179/99 M; 370/103
[58] Field of Search .......... 179/99 M; 370/103, 107, 370/100

[56] References Cited

U.S. PATENT DOCUMENTS 3,938,144  2/1976  Pederson et al. .............. 370/100 X

FOREIGN PATENT DOCUMENTS 55-3220  1/1980  Japan .................. 179/99 M

Primary Examiner—Thomas W. Brown
Attorney, Agent, or Firm—Robert E. Burns; Emmanuel J. Lobato; Bruce L. Adams

[57] ABSTRACT

A synchronization system for a key telephone system, in which key information or the like information signal between a key service unit and each key telephone set is transmitted in the form of a time-division pulse signal under the control of a counter provided in the key service unit. The information signal has a format which is divided into a first signal from the key service unit to each key telephone set and a second signal from each key telephone set to the key service unit so as to make distinction between the first and second signals in terms of time. The first signal is disposed in a time slot preceding the second signal to provide a pair of signal groups. A one-pulse start signal is disposed in the foremost time slot of the signal groups and a one-pulse answer signal is disposed in a time slot between the first signal and the second signal.

1 Claim, 4 Drawing Figures

SYNCHRONIZATION SYSTEM FOR KEY TELEPHONE SYSTEM

BACKGROUND OF THE INVENTION

1. Field of the Invention

This invention relates to a system for the synchronization of transmission signal pulses between a key service unit and key telephone sets in a key telephone system which is adapted to transmit, in a time-division pulse signal format, key information or the like between the key service unit and the key telephone sets.

2. Description of the Prior Art

Recently in order to reduce the number of cable conductors of a key telephone system, there have been proposed a variety of systems of transmitting a control signal in the form of a time-division pulse signal. However, they mostly fall into the type that call for synchronization between control circuits of the key service unit and the key telephone sets and provides therefor a synchronizing signal channel separately of a data channel heretofore employed. There has also been proposed a system of transmitting a synchronizing signal over the same channel as data, for example, by using code words different from data signals. In these conventional systems, however, another cable pair is required, and in a case of multiplex transmission using the same cable, a modem or a code detector is needed, resulting in the key telephone system becoming complex.

SUMMARY OF THE INVENTION

An object of the present invention is to provide a synchronization system for a key telephone system which is adapted to effect synchronization of information signal transmission between the key service unit and each key telephone set through utilization of a relatively simple equipment.

To achieve the above object, the present invention employs such a format of a transmission signal between the key telephone unit and each key telephone set, in which the transmission signal is divided, in terms of time, into a first signal from the key service unit to the key telephone set and a second signal from the latter to the former. The first signal is disposed in a time slot preceding the second signal to form a pair of signal groups. A one-pulse start signal is disposed in the foremost time slot of the signal groups; and a one-pulse answer signal is disposed in a time slot between the first and second signals. In each key telephone set a counter is provided, which is arranged to be started by the abovesaid start signal and synchronized, by counting input pulses thereto, with a counter provided in the key service unit. Further, in the key service unit a pulse detector is provided which detects the application of a pulse thereto only when the pulse is applied thereto within a certain period of time after occurrence of the start signal and which is arranged to receive the abovementioned answer signal. When the answer signal is not detected, the abovesaid first signal is stopped for a certain period of time by a circuit which is controlled by the output signal from the pulse detector, thereby making distinction between synchronizing pulses and data pulses.

BRIEF DESCRIPTION OF THE DRAWINGS

The construction and operation of this invention will be clearly understood from the following detailed description taken in conjunction with the accompanying drawings, in which.

DESCRIPTION OF THE PREFERRED EMBODIMENTS

Figure 1:
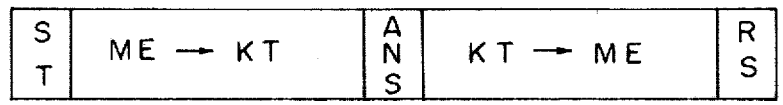
FIG. 1 is a timing chart showing the format of a transmission signal between a key service unit and a key telephone set in the present invention.

With reference to FIG. 1, the format of a transmission signal between the key service unit and each key telephone set in the present invention will first be described. In FIG. 1, reference character ST indicates a one-pulse start signal; ME→KT designates a data pulse group which is transmitted from the key service unit to each key telephone set; ANS identifies a one-pulse answer signal; KT→ME denotes a data pulse group which is transmitted from each key telephone set to the key service unit; and RS represents pulses for resetting a counting control circuit shown in FIG. 2. The pulses have the same waveform, i.e. the same pulse width and the same peak value.

Figure 2:
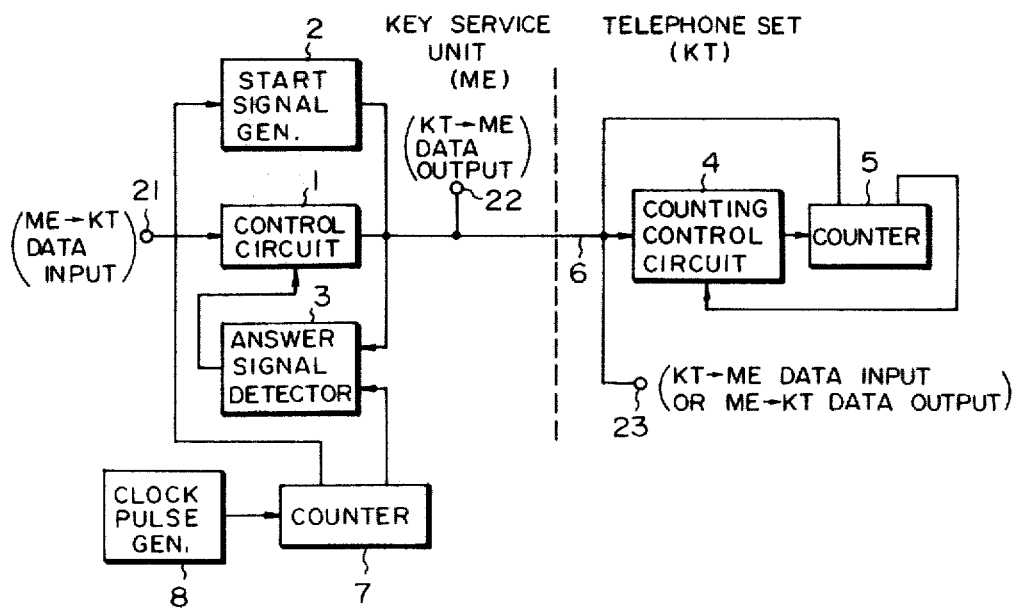
FIG. 2 is a block diagram illustrating an embodiment of the present invention.

FIG. 2 illustrates an example of the present invention. In FIG. 2, reference numeral 1 indicates a control circuit for controlling the transmission of data from the key service unit ME to the key telephone set KT; 2 designates a start signal generator; 3 identifies an answer signal detector; 4 denotes a counting control circuit which detects the start signal to control the counting operation of a counter 5; 5 and 7 represent counters; 6 shows a cable; and 8 refers to a clock pulse generator.

Next, the operation of the circuit of FIG. 2 will be described. The counter 7 is driven by clock pulses from the clock pulse generator 8 to generate reference pulses ST and ANS. The pulses thus produced are applied to the start signal generator 2 to derive therefrom a start signal, which is applied via the cable 6 to the counting control circuit 4 of the key telephone set KT. By the reception of the start signal and in synchronization therewith, the counting control circuit 4 continuously applies pulses to the counting pulse input terminal of the counter 5 until the counter 5 generates a carry pulse, which is applied, as a reset signal, to a set terminal of the counting control circuit 4. As a consequence, the counter 5 starts, in synchronization with the start signal, and continues the counting operation of the pulses from a pulse generator provided in the counting control circuit 4. When the counter 5 has continued the counting for a certain predetermined period of time, it produces at its output terminal an answer signal, which is received and detected via the cable 6 by the answer signal detector 3 provided in the key service unit ME. The answer signal detector 3 is so constructed as to generate an output signal unless it receives the answer signal after the abovesaid predetermined period of time. The control circuit 1 is a gate circuit which is formed so that it receives the data pulses ME→KT from a terminal 21 and inhibits or permits, respectively, the passage therethrough of the pulses in dependence on the absence or presence of the output signal from the answer signal detector 3.

With the above operations, the timing format of each pulse is formed as shown in FIG. 1. In the above, details of a control circuit for forming the timing format, an interface circuit between the key service unit ME and the key telephone set KT and the circuits 1 to 5, 7 and 8 are well-known in the art and hence are omitted.

Now, a description will be given, with reference to FIG. 2, of an operation when an out of synchronization has actually occurred. Prior to this, the reason for which such an out of synchronization occurs will be described.

Figure 3:
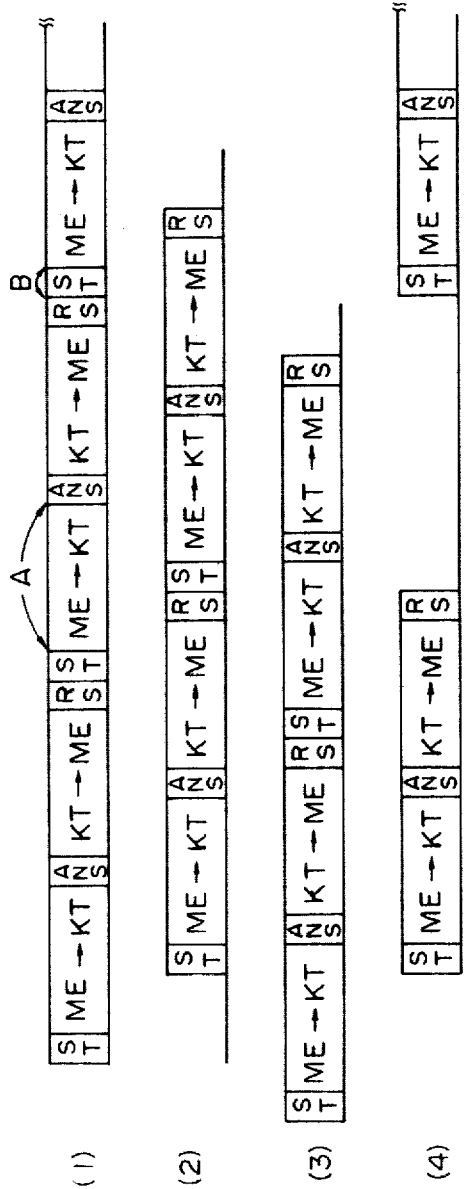
FIG. 3 shows timing charts explanatory of the operation of the present invention.

FIG. 3 shows timing charts indicating various states of the counter 5; (1), (2) and (3) respectively showing, by way of example, a state of its normal operation, a state in which the operation slightly lags the normal operation (1) and a state in which the operation slightly leads the normal operation (1). Such an out of synchronization occurs, for instance, when the key telephone set KT is connected to its telephone set connection terminal in the state in which the power source is connected to the key service unit ME and the start signals ST are sent out at regular time intervals. That is to say, that in FIG. 3(2) the key telephone set KT is connected at the time slot of the start signal ST of the key telephone set KT; in the normal operation, on the time chart (1) this time slot is allocated for the transmission of the data pulse group ME→KT from the key service unit ME, but since the data pulses are sent out from the key service unit ME, the key telephone set KT misdetects the data pulses as the start signal ST so as to activate the counter 5. If there is no gate control operation by the answer signal pulse ANS in the key service unit ME and if the sending out of the data pulses from the key service unit ME is continued, the counter 5 performs the counting operation in the manner shown by the timing chart in FIG. 3(2). This timing chart (2) differs from that (1) recognized by the key service unit ME to cause a so-called out of synchronization, making normal data transmission impossible.

With the arrangement of FIG. 2, the out of synchronization can be corrected. In the case of FIG. 3, the answer signal ANS also shifts to the right and does not occur in its normal time slot. The key service unit ME stops sending out of data A in FIG. 3(1) by the operation described previously in the connection with FIG. 2. Consequently, in the period of the data A, the counter 5 does not operate but starts the counting operation with the start signal ST in the period of the next start signal pulse B; that is, the counter 5 becomes synchronized with the timing chart of FIG. 3(1) as shown in FIG. 3(4).

At the state represented by FIG. 3(3), the first start signal ST becomes invalid in practice since the key service unit ME is not activated at this first start signal ST, so that the counting start position of the counter 5 is corrected to that of the timing chart of FIG. 3(1) from the beginning.

The above description has been given, with reference to FIG. 2, of the operation of the present invention in terms of hardware, but this is intended to facilitate a better understanding of the content of the present invention. It is a matter of course that the same operations as described above can also be achieved easily by program control using a central processor unit or the like.

Figure 4:
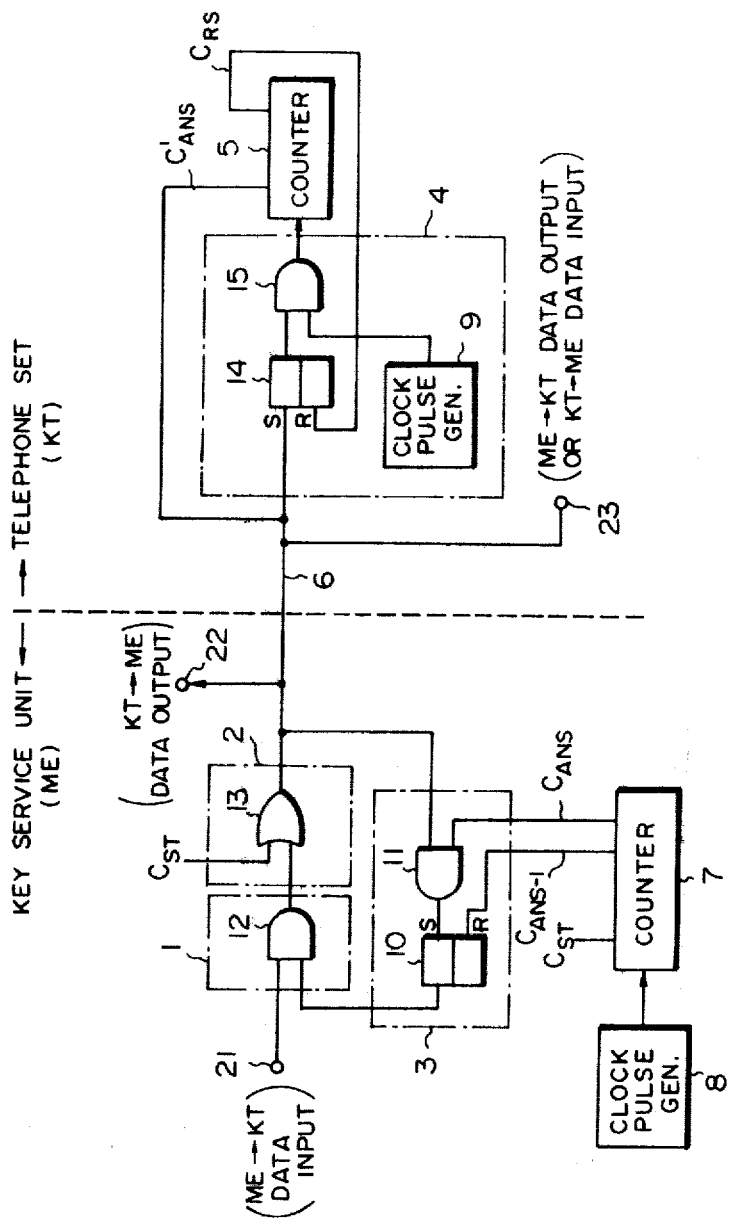
FIG. 4 is a block diagram illustrating a specific operative example of the embodiment of FIG. 2.

FIG. 4 illustrates an embodiment of the present invention which is constructed using hardware logical circuits. In FIG. 4, reference numerals 5 and 7 indicate counters; 8 and 9 designate clock pulse generators; 10 and 14 identify flip-flops; 11, 12 and 15 denote AND gates; and 13 represents an OR gate. Reference character $C_{ST}$ shows a terminal of the counter 7 at which is derived a timing pulse for the start pulse ST shown in FIG. 1; $C_{ANS}$ refers to a terminal at which is provided the answer pulse ANS; and $C_{ANS-1}$ indicates a terminal at which is generated a timing pulse earlier than the answer pulse at the terminal $C_{ANS}$ by one time slot. A terminal 21 is a data input from the key service unit ME to the key telephone set KT. A terminal 22 is a data output from the key telephone set KT to the key service unit ME. A terminal 23 is employed for a data input from the key telephone set KT to the key service unit ME or for a data output from the key service unit ME to the key telephone set KT.

The operation of the circuit of FIG. 4 is as follows: The counter 7 operates, as a ring counter, on clock pulses derived from the clock pulse generator 8 and generates the timing pulse at the terminal $C_{ST}$, which pulse is applied via the OR gate 13 and the cable 6 to a set terminal S of the flip-flop 14 to set it. The set output from the flip-flop 14 is supplied to the gate 15 to activate it, through which clock pulses from the clock pulse generator 9 are applied to the counter 5 to start its counting operation. Since the counter 5 is preset so that it generate an output signal at its terminal $C'_{ANS}$ at the same timing as the counter 7 produces the timing pulse at the terminal $C_{ANS}$, the output signal from the counter 5 is synchronized with the signal at the terminal $C_{ANS}$ of the counter 7, and the gate 11 provides an output. As a result of this, the flip-flop 10 is set and its set output is applied to the gate 12 to activate it, permitting the signal ME→KT to be sent out therethrough to the key telephone set KT.

The above is the operation in the normal state. When the synchronization between the key service unit ME and the key telephone set KT is disturbed, that is, when the counters 7 and 5 do not operate at the same timing, the output signals at the terminals $C_{ANS}$ and $C'_{ANS}$ of the counters 7 and 5 are not synchronized with each other, so that the flip-flop 10 is not set and the gate 12 is not activated, thus stopping the sending out of the data ME→KT.

At this time, the counter 5 applies a reset pulse $C_{RS}$ of its own to the flip-flop 14 to reset it and waits for the application of the start signal $C_{ST}$ from the key service unit ME and, upon arrival of the start signal $C_{ST}$, starts the counting operation. Thus, the out of synchronization is corrected.

Since synchronization between the clock pulse generators 8 and 9 is not directly related to the present invention, details therefore are omitted, but they can be synchronized with each other, for example, by the system disclosed in U.S. Pat. No. 4,234,765, entitled "Key Telephone System".

As has been described in the foregoing, according to the present invention, it is possible to effect, without employing special means such as a synchronizing signal detector or the like, the synchronization between control data and transmitting signals in a key telephone system which has been complicated in the past; hence, the present invention permits simplification of the system and is of great utility in terms of the fabrication and the lowering of the cost thereof.

What we claim is:

1. A synchronization system for a key telephone system, in which key information or the like information signal between a key service unit and each key telephone set is transmitted in the form of a time-division pulse signal under the control of a first counter provided in the key service unit, characterized in that the information signal has a format which is divided into a first signal from the key service unit to each key telephone set and a second signal from each key telephone set to the key service unit so as to make distinction between the first signal and the second signal in terms of time, the first signal being disposed in a time slot preceding the second signal to provide a pair of signal groups, a one-pulse start signal being disposed in the foremost time slot of the signal groups and a one-pulse answer signal is disposed in a time slot between the first and second signals; said each key telephone set comprising a second counter for producing a reference signal for controlling the transmission of the information signal in the key telephone set and a counting control circuit for detecting the start signal to start the second counter; said key service unit comprising an answer detector for detecting, as the answer signal, a pulse present in the information signal when a certain period of time has passed after occurrence of the start signal and a control circuit for stopping the first signal for a certain period of time when the answer signal is not detected by the answer signal detector after the certain period of time has passed after occurrence of the answer signal, whereby the first counter and the second counter are synchronized with each other.

* * * * *